(12) United States Patent
Larsson

(10) Patent No.: US 7,879,274 B2
(45) Date of Patent: Feb. 1, 2011

(54) METHOD OF MAKING A TWO-PIECE END PLUG FOR INSERTION INTO AN END OF A PAPER ROLL

(75) Inventor: Bjorn Larsson, Billdal (SE)

(73) Assignee: SCA Hygiene Products AB, Gothenburg (SE)

( * ) Notice: Subject to any disclaimer, the term of this patent is extended or adjusted under 35 U.S.C. 154(b) by 271 days.

(21) Appl. No.: 12/068,052

(22) Filed: Feb. 1, 2008

(65) Prior Publication Data

US 2008/0142632 A1 Jun. 19, 2008

Related U.S. Application Data

(60) Division of application No. 11/593,165, filed on Nov. 6, 2006, now Pat. No. 7,431,236, which is a continuation of application No. PCT/SE2004/000728, filed on May 12, 2004.

(51) Int. Cl.
*B29C 45/14* (2006.01)
*B29C 45/16* (2006.01)
*B29C 61/02* (2006.01)

(52) U.S. Cl. ............... 264/242; 264/255; 264/250; 264/267; 264/230; 264/328.7; 264/342 R

(58) Field of Classification Search ............ None
See application file for complete search history.

(56) References Cited

U.S. PATENT DOCUMENTS 2,815,906 A * 12/1957 Hofmeier .................. 225/38
2,879,010 A * 3/1959 Crawford ................ 242/118.32
3,785,217 A * 1/1974 Peura ..................... 474/190
3,997,124 A 12/1976 Sato
4,015,711 A 4/1977 Mason
4,372,500 A 2/1983 Saraisky
4,600,162 A * 7/1986 Hidle ..................... 242/596.5
4,659,031 A * 4/1987 Saraisky .................. 242/613.5
4,908,922 A * 3/1990 Abe ....................... 29/898.062
5,043,126 A * 8/1991 Thurau .................... 264/242
5,199,171 A * 4/1993 Umezawa et al. ......... 29/898.07
5,304,336 A * 4/1994 Karlsson et al. ........... 264/242
5,577,686 A 11/1996 Moody
5,597,135 A * 1/1997 Vandersteene ........... 242/599.4
5,755,397 A 5/1998 Freese
6,444,065 B1 * 9/2002 Reil et al. ................ 156/86

FOREIGN PATENT DOCUMENTS

EP 0 705 556 4/1996

* cited by examiner

*Primary Examiner*—Edmund H. Lee
(74) *Attorney, Agent, or Firm*—Young & Thompson

(57) ABSTRACT

An end plug (1) for insertion into an end of a paper roll includes an inner (2) and an outer piece (3), the pieces being rotatably attached to each other and prevented from axial movement in relation to each other by at least one protrusion (6) of one of the pieces running in an annular groove (7) in the other of the pieces. A method of manufacturing such an end plug is also disclosed.

17 Claims, 2 Drawing Sheets

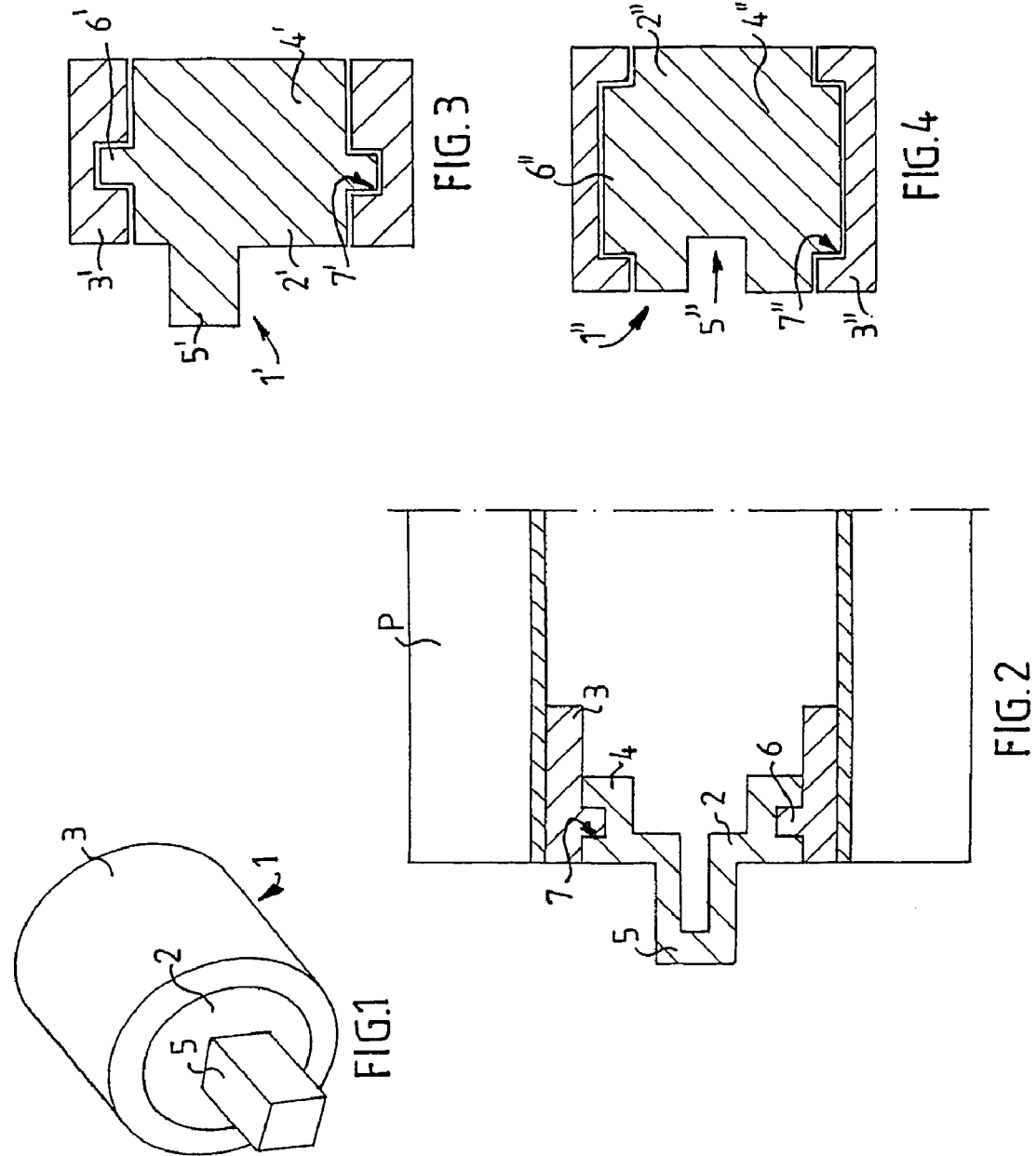

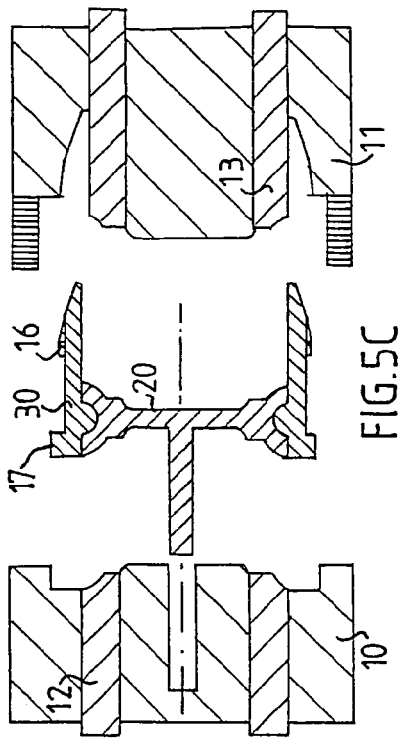
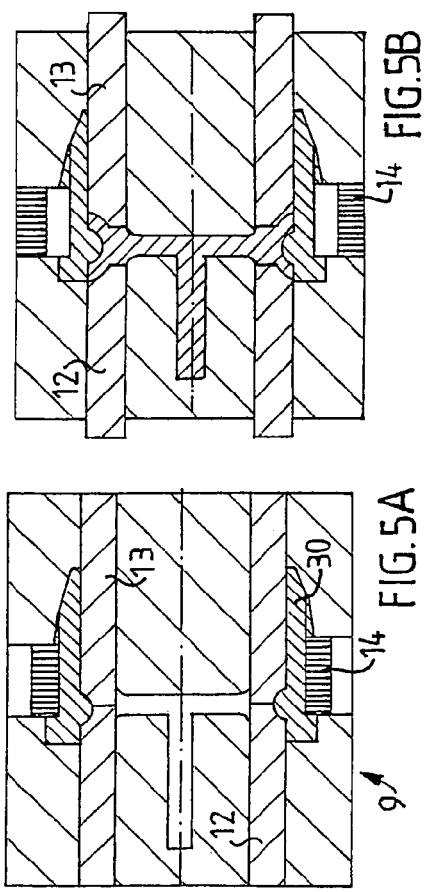
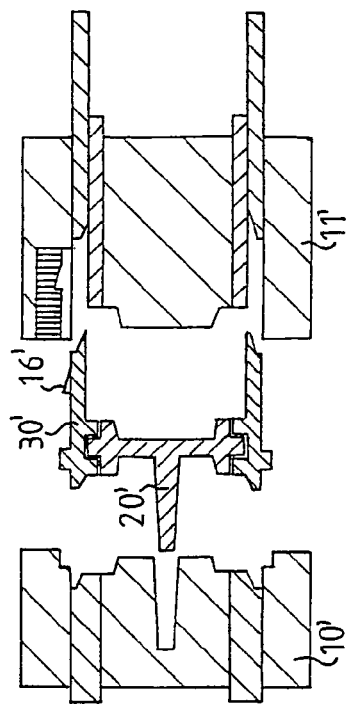
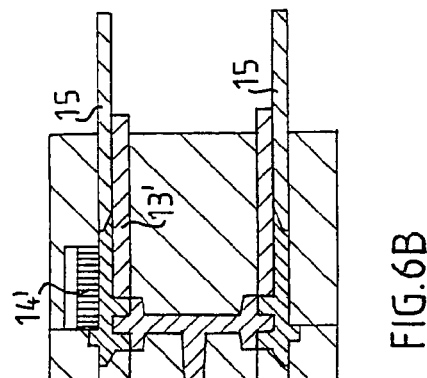
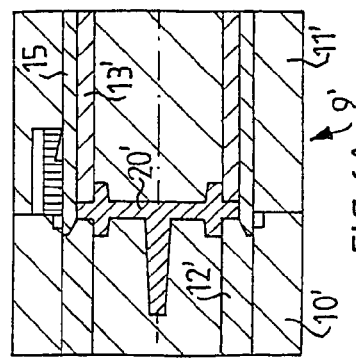

METHOD OF MAKING A TWO-PIECE END PLUG FOR INSERTION INTO AN END OF A PAPER ROLL

CROSS REFERENCE TO RELATED APPLICATION

This application is a division of application Ser. No. 11/593,165 filed on Nov. 6, 2006, now U.S. Pat. No. 7,431,236 which is a continuation of international application PCT/SE2004/000728, which was filed on 12 May 2004, and designated the United States of America. The entire contents of each of these applications is hereby expressly incorporated by reference.

FIELD OF THE INVENTION

The present invention relates to an end plug for insertion into an end of a paper core and a method for manufacturing such an end plug.

BACKGROUND OF THE INVENTION

In order to place paper rolls in dispensers, end plugs are inserted into the ends of the paper roll. The paper roll can then be removably attached to the dispenser by attachment means axially protruding from the end plugs. In order to have a smooth and even rotation of the paper roll when paper is drawn therefrom, the end plugs can comprise two coaxially disposed pieces being rotatable in relation to each other. Furthermore, for convenient handling the two pieces of the end plugs should also be prevented from axial movement in relation to each other.

The objective of the present invention is to obtain an end plug of the above mentioned kind consisting only of two pieces and of a construction enabling a simple and cost effective manufacturing thereof.

SUMMARY OF THE INVENTION

This objective is accomplished by an end plug for insertion into an end of a paper roll, characterized in that it consists of an inner and an outer piece, said pieces being rotatably attached to each other and prevented from axial movement in relation to each other by at least one protrusion of one of said pieces running in an annular groove in the other of said pieces.

In a preferred embodiment the at least one protrusion has the form of an annular flange, which protrudes radially outwardly from the outer surface of the inner piece or protrudes radially inwardly from the inner surface of the outer piece. The inner and outer pieces are made of different plastic materials and the plastic material in said outer piece has a higher melting point than the plastic material in said inner piece. The outer piece is preferably made of a polyolefin based material, such as polypropylene or polyethylene, and the inner piece is preferably made of high impact polystyrene. An outer end of the plug has means for removably attaching the plug to a dispenser wall. The means for removably attaching the plug to a dispenser wall is in an advantageous embodiment eccentrically disposed in relation to the rotational axis of the end plug. In a first alternative at least one pin projects from an outer end of said plug and in a second alternative at least one recess is provided in the outer end of said plug.

The invention also relates to a method of moulding a two-piece end plug for insertion into an end of a paper roll, said end plug consisting of an inner and an outer piece being rotatably attached to each other and prevented from axial movement in relation to each other by at least one protrusion of one of said pieces running in an annular groove in the other of said pieces, characterized in that one of the inner and outer pieces of said end plug is part of a mould for moulding the other.

In a preferred embodiment the moulding of the inner and outer piece of said end plug is made in the same mould and filling of the mould for moulding the second piece of said end plug is made before cooling and hardening of the first piece is terminated.

BRIEF DESCRIPTION OF THE DRAWINGS

The invention will now be described with reference to the enclosed figures, of which;

FIG. 1 schematically shows a perspective view of an end plug according to a preferred first embodiment of the invention, FIG. 2 shows an axial cross-sectional view of the end plug of FIG. 1 inserted into the core of a paper roll, FIGS. 3 and 4 schematically disclose views similar to FIG. 2 of end plugs according to a second and third embodiment of the invention, and FIGS. 5A-5C schematically illustrate a method of moulding an end plug according to a first preferred embodiment, and FIGS. 6A-6C schematically illustrate a method of moulding an end plug according to a second embodiment.

DESCRIPTION OF EMBODIMENTS

In FIGS. 1 and 2, a first embodiment of an end plug 1 according to the invention is schematically shown. The end plug 1 consists solely of two pieces, an inner piece 2 and an outer piece 3. The outer piece 3 has the form of a tube with a cylindrical outer surface fitting into the core of a paper roll P, as is shown in FIG. 2. The inner piece 2 comprises a tubular part 4 coaxially disposed within the outer piece 3 and an attachment portion 5 projecting axially from the outer end surface of the tubular part 4 of the inner piece 2. This attachment portion 5 is configured to fit into a roll suspension means in a dispenser (not shown). Furthermore, the two pieces 2 and 3 are prevented from axial displacement in relation to each other by an annular flange 6 protruding from the inner surface of the outer piece 3 and disposed in a groove 7 in the outer surface of the tubular part 4 of the inner piece 2. The outer diameter of the tubular part 4 of piece 2 is slightly less than the inner diameter of piece 3 and the groove 7 has slightly larger dimensions than the annular flange 6. Thus, the two pieces 2 and 3 are free to rotate in relation to each other.

The pieces 2 and 3 are preferably made of two different plastic materials having a low coefficient of friction to each other.

In FIG. 3, a second embodiment of an end plug 1' is schematically shown. Components of the end plug 1' being similar to corresponding components the end plug 1 shown in FIGS. 1 and 2 are given the same reference numerals with the addition of a prime sign. The end plug 1' differs from the end plug 1 in two respects, namely that the annular flange 6' is disposed on the inner piece 2', the groove 7' consequently being disposed in the outer piece 3', and that the attachment portion 5' is displaced from the common axis of the outer piece 3' and the cylindrical portion 4' of the inner piece 2'. Since the two pieces by which the end plug is composed are rotatable in relation to each other, the inner piece can be non-rotatable attached to the roll suspension means of the dispenser and the attachment portion need not be placed in the rotational centre of the end plug. Neither need the attachment portion have any special sectional shape but can have a cross-section in the form of a rectangle (as shown in FIG. 1), a triangle, a circle or any other shape.

In FIG. 4 a third embodiment of an end plug 1" is shown in cross-section. Components of the end plug 1" being similar to corresponding components the end plug 1 shown in FIGS. 1 and 2 are given the same reference numerals with the addition of a bis sign. This plug 1" differs from end plug 1' according to FIG. 3 in that the annular flange 6" and the groove 7" have much larger dimensions than the flange 6' and groove 7' of the end plug 1'. In fact, the flange 6" is so large that it covers the larger part of the length of the cylindrical portion 4" of the piece 2". Thus, this embodiment can also be described by stating that the portion 4" has an annular recess in each of its ends and that outer piece 3" has two inwardly turned, annular end flanges. The terms "protrusion", "flange" and "groove" in the claim language covers both the above mentioned ways of describing the end plug 1'. The attachment portion 5" in the embodiment shown in FIG. 4 has the shape of a recess instead of a projection as in the embodiments according to FIGS. 1-3. The attachment portion 5" is designed to cooperate with a suitable projection of the roll suspension means of a dispenser, such a projection preferably being resiliently movable in an axial direction relative to the end plug.

In FIGS. 1-3, only one annular flange is shown. However, it is of course possible to provide the end plug with two or more flanges running in grooves. If more than one annular flange is used, the flanges need not be provided on the same piece. In FIGS. 3 and 4, the pieces 2' and 2" are solid bodies. This is, however, usually not preferred since the loads on the end plugs normally are rather small. It is thus envisaged to make the end plugs shown in FIGS. 3 and 4 hollow in analogy with the end plug shown in FIGS. 1 and 2.

In dispensers for paper rolls, an end plug is normally inserted into each of the opposite ends of the core of the paper roll before the projecting attachment portions are placed into recesses or the like in opposite walls in the dispenser. However, in some cases an end plug is only inserted into one of the ends of the core of a paper roll. In such cases, the attachment portion preferably is provided with a radial groove or the like which could be inserted onto a wall piece or the like in the dispenser in order to prevent axial displacement of the end plug in relation to the dispenser. The attachment portion can of course also be frictionally held in the wall of the dispenser.

FIGS. 5A-5C illustrate schematically the steps in the moulding of an end plug essentially corresponding to an end plug according to the embodiment disclosed with reference to FIGS. 1 and 2. The essence of the method is to use the outer piece as part of the mould when moulding the inner piece.

The first step in the moulding process is shown in FIG. 5A. In this figure, an outer piece 30 has been moulded in the mould 9 from a first plastic material. The mould 9 comprises a left main part 10 and a right main part 11, these parts being axially movable relative to each other, as is best illustrated in FIG. 5C. Further, a left annular part 12 of the mould 9 is axially movable in an annular recess of the left main part 10, and a right annular part 13 is axially movable in a recess in the right main part 11. In FIG. 5A, these annular parts 12,13 are in contact with each other, thereby defining the inner surface of the form chamber for the outer piece 30. The remaining parts of the form chamber for the outer piece 30 are formed by recesses in the left and right main parts 10 and 11 and by two or more annular segments 14, being movable in a radial direction from the position shown in FIG. 5A to the position shown in FIGS. 5B and 5C. In FIG. 5A, the form chamber for the outer piece 30 has been filled with a first plastic material in a molten state.

The first plastic material in the form chamber for the outer piece 30 is then allowed to cool and harden. Thereafter, the annular parts 12 and 13 are moved to the left and right, respectively, to the positions shown in FIG. 5B, and the segments 14 are possibly moved to their outer positions. By the movements of the annular parts 12 and 13, the form chamber for moulding the inner piece 20 is formed. As evident from FIG. 5B, the portions of the inner surface of the outer piece 30 being uncovered by the movements of the annular parts 12,13 form part of the form chamber for the inner piece 20.

A second plastic material in molten state is then introduced into the form chamber for the inner piece 20 and is then allowed to cool and harden. The second plastic material should preferably have a lower melting point than the first plastic material so that the warm second plastic material introduced in the form chamber for the inner piece 20 will not melt the inner surface of the outer piece 30 when brought into contact therewith. The second plastic material should also preferably be incompatible with the first plastic material so it will not adhere to the exposed inner surface of the outer piece 30.

Thereafter, the inner piece 20 and also the outer piece 30, if this piece has not cooled down to ambient temperature when the second plastic material is introduced into the form chamber for the inner piece 20, are allowed to cool and harden. Simultaneously with the cooling, the inner piece 20 will shrink and thereby be distanced a small distance from the inner surface of the outer piece 30. If the outer piece 30 had not cooled down to ambient temperature when the second plastic material was introduced into the form chamber for the inner piece 20, some shrinkage would also occur in the outer piece. In such a case, it must be seen to that the shrinkage of the inner piece is larger than the shrinkage of the outer piece. Therefore, the coefficient of shrinkage of the first plastic material should preferably be lower than the coefficient of shrinkage of the second plastic material and should at least not be higher.

Due to the larger shrinkage of the inner piece 2, the inner and outer pieces 20 and 30 will thus become rotatable in relation to each other when said pieces have hardened.

The parts 10 and 11 will be moved away from each other after the forming of the inner piece 20 when this piece has reached a hardened state.

The inner piece 20 and the outer piece 30 in the embodiment shown in FIG. 5C differ in some respects from the inner piece 2 and outer piece 3 according to the embodiment described in connection with FIGS. 1 and 2. The annular flange of the inner piece 20 and its co-operating groove in the outer piece 30 have half-circular shapes instead of the rectangular shapes shown in FIG. 2. Moreover, the outer piece 30 has an outwardly turned flange 17 and also two or more wedge shaped projections 16 around its periphery.

In FIGS. 6A-6C a moulding process is shown which differs from the process shown in FIGS. 5A-5C mainly in that the inner piece 20' is moulded before the outer piece 30'. Also in this process the moulding is made in the same mould 9'. The mould 9' is in principle constructed in the same manner as the mould 9 shown in FIGS. 5A-5C. However, in addition to the left and right main parts 10',11', the left and right annular parts 12',13' and the annular segments 14', the mould 9' comprises an outer annular part 15, which is removable in an axial direction in an axial recess in the right main part 11'.

In FIG. 6A, the form chamber for the inner piece 20' has been filled with the second plastic material. When this material has began to harden so that the annular surface of the inner piece 20' being part of the form chamber for the outer piece 30' has reached a hardened state, the annular parts 12',13' and 15 are moved to the positions shown in FIG. 6B. Thereafter, the thus formed form chamber for the outer piece 30' is filled with the first plastic material in molten state.

The inner and outer pieces 20' and 30', respectively are then allowed to cool and harden. During the hardening both the inner and outer pieces shrink. In order to obtain a distance between the adjacent surfaces of the inner and outer pieces, the inner piece must be made of a material having a larger coefficient of shrinkage than the outer piece. Furthermore, the introduction of the first plastic material in the form chamber for the outer piece must be made before the moulded inner piece has been allowed to shrink too much. The moulding process described with reference to FIGS. 6A-6C must therefore be much more precisely controlled in order to obtain inner and outer pieces being rotatable relative each other than the process described with reference to FIGS. 5A-5C.

The inner and outer pieces of an end plug according to the present invention are thus preferably made of different plastic materials. The plastic material of the piece that is moulded first should preferably have a higher melting point than the plastic material of the piece that is moulded secondly in order to maintain the shape of this piece in spite of the temperature of the melted plastic material for the other piece being in contact with surfaces of the first moulded piece. Moreover, the first and second plastic material should preferably be incompatible with each other so that the melted plastic material of the last moulded piece will not fasten on, or adhere to surfaces of the other piece.

Suitable combinations of plastic materials are for cost reasons polyolefins, such as High Density Polyethylene (HDPE) or polypropylene (PP) combined with Polystyrene (PS), Polyamide (PA), polycarbonate (PC) polyoxymethylene (POM), or ABS, but many other material combinations are possible.

In the described embodiment, the end plug is to be used together with a paper roll having a core of hard paper, cardboard or the like. End plugs according to the present invention can of course also be inserted into the ends of a coreless paper roll. In order to facilitate the insertion the inner end of the end plug could advantageously be bevelled. Furthermore, end plugs according to the present invention can also be used together with solid paper rolls, i.e. rolls without open ends. In such a case, the inner end of the end plug will taper so that the inner end of the end plug will attain a shape similar to the shape of a golf peg, thereby enabling an insertion of the end plug into the end of a solid paper roll. It is of course also possible to provide the end plug with other means than tapering ends for enabling insertion into the end of a solid paper roll, for example, the inner end of the end plug may be provided with needle-like projections.

The described embodiments can of course be modified in many ways without departing from the scope of the invention. For example, the end plugs may be provided with more than one attachment portion and the annular flanges and grooves can have other shapes than those shown in the figures, for example, the flanges with rectangular cross-section can have rounded sides. Moreover, when the outer piece is moulded first, it need not be moulded in the same mould as the inner piece, but can be moulded or produced in any other suitable way, and thereafter introduced into the form for moulding the inner piece, then forming part of the form chamber for the inner piece. The scope of protection shall therefore be defined only by the wording of the enclosed patent claims.

The invention claimed is:

1. A method of moulding an end plug having only two-pieces, said end plug being configured for insertion into an open end of a paper roll, said end plug having only two-pieces comprising an integrally formed inner piece and an outer piece rotatably attached to said inner piece, said inner and outer pieces being prevented from axial movement in relation to each other by at least one protrusion of one of the inner and outer pieces running in an annular groove in an other of said inner and outer pieces, wherein one of the inner and outer pieces of said end plug having only two-pieces is part of a mould for moulding the other of said inner and outer pieces, said method comprising:

forming the outer piece from a first plastic material in a molten state;

allowing the outer piece to cool and harden; and forming the integrally formed inner piece only from a second plastic material, said second plastic material having a lower melting point than the first plastic material, the second plastic material being incompatible with the first plastic material so that the integrally formed inner piece will not adhere to an exposed inner surface of the outer piece.

2. The method according to claim 1, wherein the moulding of the inner and outer piece of said end plug having only two-pieces is made in the same mould.

3. The method according to claim 1, wherein filling of the mould for moulding the second piece of said end plug having only two-pieces is made before cooling and hardening of the first piece is terminated.

4. A method of moulding an end plug having only two-pieces, said end plug having only two-pieces being configured for insertion into an open end of a paper roll, said end plug having only two-pieces comprising an integrally formed inner piece and an outer piece being rotatably attached to each other and prevented from axial movement in relation to each other by at least one protrusion of one of the inner and outer pieces running in an annular groove in an other of said inner and outer pieces, the method comprising:

providing a mould having a left main part and a right main part which are axially movable relative to each other;

said mould having a left annular part which is axially movable in an annular recess of the left main part, and a right annular part axially movable in a recess in the right main part; said annular parts being in contact with each other an defining an inner surface of a first form chamber for the outer piece;

filling the first form chamber with a first plastic material in a molten state;

cooling and hardening the first plastic material;

axially moving the annular parts in opposite directions to form a second form chamber for the inner piece;

introducing into the second form chamber only a second plastic material in a molten state and having a lower melting point than the first plastic material, said second plastic being incompatible with the first plastic material so that the integrally formed inner piece will not adhere to an exposed inner surface of the outer piece; and cooling and hardening the inner piece to form said end plug having only two-pieces.

5. A method of moulding a two-piece end plug for insertion into an open end of a paper roll, said end plug comprising:

an integrally formed innermost piece having at least one axial extention that is offset radially inward from an outermost surface of said innermost piece; and an outermost piece rotatably attached to said innermost piece, said innermost and outermost pieces being prevented from axial movement in relation to each other by a protrusion of one of the innermost and outermost pieces running in an annular groove in an other of said innermost and outermost pieces, wherein one of the innermost and outermost pieces of said end plug is part of a mould for moulding the other of said innermost and outermost pieces, said method comprising:

forming the outer piece from a first plastic material in a molten state;

allowing the outer piece to cool and harden; and forming the integrally formed inner piece only from a second plastic material, said second plastic material having a lower melting point than the first plastic material, the second plastic material being incompatible with the first plastic material so that the integrally formed inner piece will not adhere to an exposed inner surface of the outer piece.

6. The method according to claim 1, wherein there is a distance between the outer piece and the exposed inner surface of the outer piece.

7. The method according to claim 1, wherein the first plastic material has a coefficient of shrinkage that is equal to or lower than the coefficient of shrinkage of the second plastic material.

8. The method according to claim 1, wherein the first and second plastic materials are at least one selected from the group consisting of polyelefins, high density polyethylene, polypropylene, polystyrene, polyamide, polyoxymethylene and acrylonitrile-butadiene-styrene.

9. The method according to claim 1, wherein the first and second plastic materials have a low coefficient of friction to each other.

10. The method according to claim 4, wherein there is a distance between the outer piece and the exposed inner surface of the outer piece.

11. The method according to claim 4, wherein the first plastic material has a coefficient of shrinkage that is equal to or lower than the coefficient of shrinkage of the second plastic material.

12. The method according to claim 4, wherein the first and second plastic materials are at least one selected from the group consisting of polyelefins, high density polyethylene, polypropylene, polystyrene, polyamide, polyoxymethylene and acrylonitrile-butadiene-styrene.

13. The method according to claim 4, wherein the first and second plastic materials have a low coefficient of friction to each other.

14. The method according to claim 5, wherein there is a distance between the outer piece and the exposed inner surface of the outer piece.

15. The method according to claim 5, wherein the first plastic material has a coefficient of shrinkage that is equal to or lower than the coefficient of shrinkage of the second plastic material.

16. The method according to claim 5, wherein the first and second plastic materials are at least one selected from the group consisting of polyelefins, high density polyethylene, polypropylene, polystyrene, polyamide, polyoxymethylene and acrylonitrile-butadiene-styrene.

17. The method according to claim 5, wherein the first and second plastic materials have a low coefficient of friction to each other.

* * * * *